3,034,334
METHOD OF NON-DESTRUCTIVE ANALYSIS FOR LATENT DEFECTS
Taber de Forest, Northbrook, Ill., assignor to Magnaflux Corporation, Chicago, Ill., a corporation of Delaware
Filed Jan. 2, 1957, Ser. No. 632,183
3 Claims. (Cl. 73—15.4)

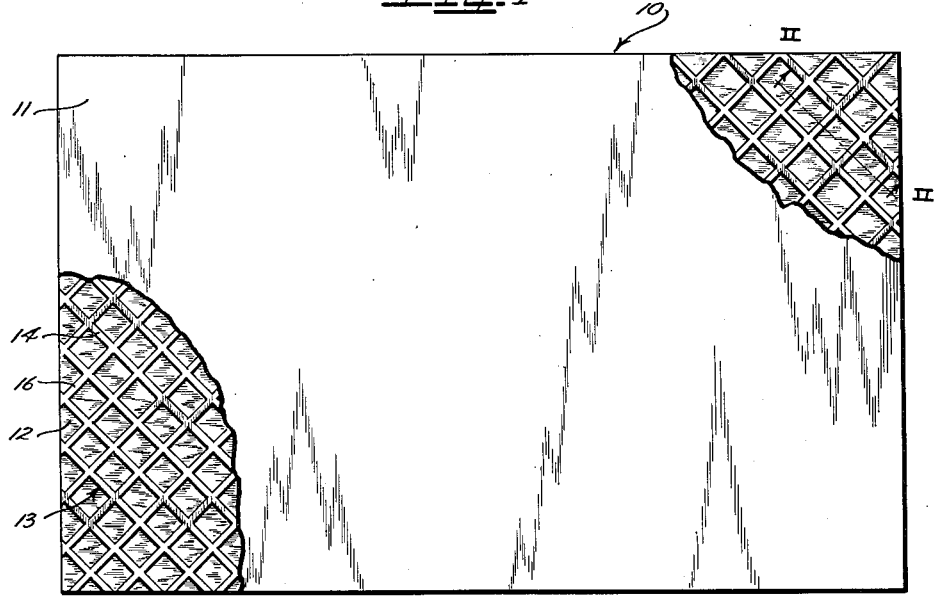
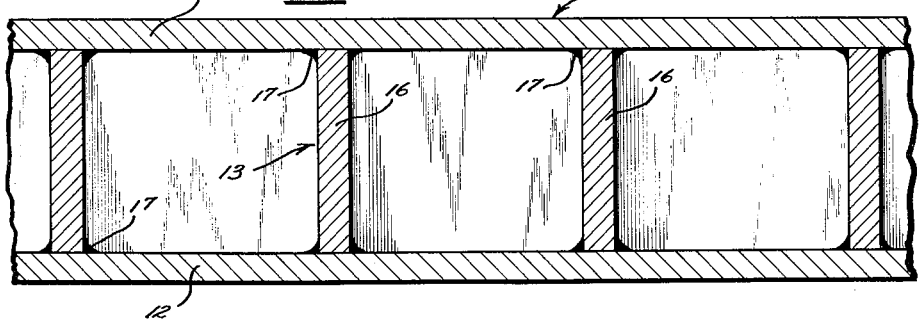
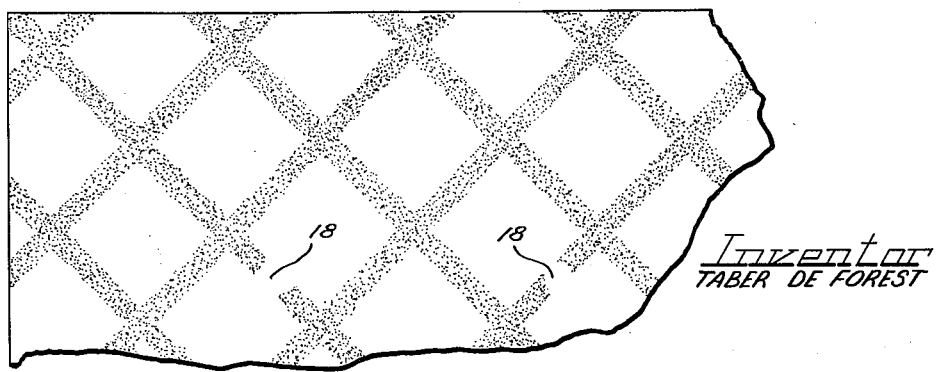

The present invention is directed to an improved process for locating latent defects in articles and, particularly for detecting the presence of bond discontinuities in laminated articles and other composite bonded articles.

The method of the present invention is applicable generally to the testing of bonds in various forms of bonded articles. As examples I might mention the testing of laminated structures consisting of continuous metal sheets, testing for continuity of bond between a plating and the underlying base metal, and testing for continuity in soldered joints, welded joints, and brazed areas.

The method of the present invention is particularly applicable to the testing of laminated metal assemblies consisting of a pair of continuous metallic sheets of steel or the like separated by reinforcing means which may take the form of a metal honeycomb network, or corrugated metal, or the like. Such laminated metal assemblies are finding greater use where, for one reason or another, such lightweight structural materials as aluminum or magnesium are not completely satisfactory.

The reinforcing means described above is normally secured to the outside panels or sheets of metal by incorporating a bond of a brazing metal between the areas of contact existing between the reinforcing means and the outer panels. In order to achieve the maximum amount of rigidity and strength, these bonds should be continuous.

The testing of such reinforced members for continuity in the bonds has always posed several difficult problems. One method which has been employed in the past to test the soundness of the bond involved applying a thin layer of sand onto the member to be tested and then vibrating the entire member. With this type of testing, it is sometimes possible to detect areas in which bonding of the reinforcing means to the outer plates is defective by observing, during the vibration the difference in the movement of the sand in defectively bonded areas from that of the sand in areas where adequate metal-to-metal bonds are present. At best, this method is not particularly effective to detect discontinuities and, furthermore, the method can only be used in connection with flat surfaces.

Still another method of testing which has been utilized to a small extent involves tapping the outer surface of the reinforced member at closely spaced intervals and detecting differences in sound as a basis for determining the presence of bonded and non-bonded areas. Of course, such a method is completely impractical on a commercial basis.

The present invention provides a rapid method for the detection of bond discontinuities in laminated structures, or other composite bonded structures, whether metallic or non-metallic, in which a bonding occurs along spaced areas of an outer sheet or plate of the laminate.

An object of the present invention is to provide an improved method of analyzing laminated articles for latent defects.

Another object of the invention is to provide a quick but highly effective means for determining discontinuities in bonds existing between a reinforcing member and a continuous sheet member to which the reinforcement is bonded.

Still another object of the invention is to provide a method for positively identifying the location of bonding defects in laminated articles composed of heat conductive materials, regardless of the form or shape of the article being tested.

In the method of the present invention, the article to be tested is coated with a liquid capable of wetting the outer surface and also capable of undergoing a morphological change upon a change in temperature. By "morphological change" I mean that the material undergoes a change in form in response to variations in temperature such, for example, as by changing its viscosity, surface tension, or density to a sufficient degree that the material forms a film or deposit which can be readily recognized upon such change in temperature.

After the liquid is coated onto the surface, the coated surface is subjected to a change in temperature sufficient to cause the morphological change and thereby render the location of discontinuities in the bonded areas contrastingly visible with respect to areas where continuous bonds occur.

The reasons for the production of contrast between the bonded and non-bonded areas according to the above described process are still not completely understood. Since the method of the invention works far better with reasonably good heat conducting materials than with materials which are only fair or are poor conductors of heat, it is reasonable to assume that one explanation lies in the better thermal conductivity which occurs between those portions of the plate or other outer member which have adequate bonding to the inner reinforcing means, as compared with those portions which are not so bonded.

Many different types of coating materials can be satisfactorily employed in the practice of the present invention. I prefer, however, to use a simple indicating liquid such as a solution of a dye in an oil base, or a dispersion of a pigment in an oil base.

In the selection of a suitable liquid for coating purposes, the following characteristics should be borne in mind. The liquid should be one which is capable of wetting the surface to which it is applied. The liquid must also be quite mobile under the conditions of application so that it spreads out into a relatively uniform thin film over the entire surface. In the case of a coating in which a dye or pigment is involved, the vehicle should have a relatively high temperature of vaporization and should be non-toxic. Of course, if a dye is included, the vehicle should have a sufficient solvent power with respect to the dye to dissolve adequate concentrations of the dye. Generally, the vehicle should not contain water except where the vehicle itself might be miscible with water.

Any of a wide variety of dyes can be employed for the purposes of the invention, but it is preferable to select a dye which provides a contrast in color to the surface being treated. For example, suitable dyes for metallic surfaces may be of the type such as No. 322 Mefford oil red dye, or Du Pont oil Blue A, or the like. Fluorescent dyes such as "Fluorol 7 GA" sold by the General Dyestuffs Corporation, "Perylene" or "Celliton Brilliant Yellow FFA" may also be employed.

Pigments such as chalk or rouge are entirely suitable for the practice of the present invention when used in dispersed form in a suitable vehicle, either as such or in combination with a dye.

The relative amounts of dye in a vehicle can vary substantially, but in general about 1 to 10 grams of the dye per 100 milliliters of the vehicle will be satisfactory.

It should be mentioned that in some instances, the vehicle alone without any additive can be employed satisfactorily to present a suitable indication. However, it is far more convenient to include a coloring element such as a dye or a pigment for better contrast.

When a colored oil solution is applied as a film to the surface to be tested, and heat is thereafter applied (as for example by infra-red lamps or other suitable heating units) a very definite pattern of the underlying reinforcing means will be observed after only a short exposure to the heat. Apparently, the higher thermal conductivity of the member in the regions where the outer plate is bonded to the metal reinforcement is responsible for changing the surface tension characteristics and/or the viscosity of the coating sufficiently to render those portions contrastingly visible to portions in which there is no bonding between the outer plate and the reinforcing member. For example, in the case of a red dye, after a few seconds exposure to a source of heat, a honeycomb reinforced steel plate assembly will exhibit a honeycomb pattern in dark red in those areas of the member which are bonded to the underlying reinforcement while the spaces between the reinforcement and those spaces in which the bonding to the plate is defective will remain a relatively light pink color.

A further description of the present invention will be made in conjunction with the attached sheet of drawings which illustrates a preferred embodiment.

In the drawings:

FIGURE 1 is a plan view, partly broken away illustrating a honeycomb type reinforced structural member;

FIGURE 2 is a fragmentary cross-sectional view taken along line II—II of FIGURE 1; and FIGURE 3 is a plan view of the reinforced member indicating the contrasting pattern obtained by the method of the present invention.

As shown on the drawings:

In FIGURE 1, reference numeral 10 indicates generally a structural element of the type consisting of a pair of opposed outer plates 11 and 12 composed of stainless steel or the like separated by a reinforcing means 13. The latter, in the arrangement shown, consists of a honeycomb network of spaced parallel metal strips 14 in combination with similar strips 16 extending at substantially right angles to the strips 14. Of course, the form of reinforcement shown is purely exemplary, and the reinforcing means may take any geometric form such as sinusoidally shaped corrugations, or the like.

As indicated best in FIGURE 2 of the drawings, the reinforcing means 13 is bonded edgewise to the plates 11 and 12 by means of deposits of a brazing material 17 extending along the areas of contact between edge surfaces of the reinforcing means 13 and the opposed plates 11 and 12.

To detect for discontinuities in the bonds 17, the outer surface of the plate 11 is coated with a film of a dye dissolved in a freely flowable oil such as an ordinary fuel oil. The coated surface is then exposed to the action of heat such as a bank of infra-red lamps for a matter of a few seconds or a few minutes or more, depending upon the thermal conductivity of the article being tested and the intensity and distance of the heat source from the surface being heated. Shortly after the application of heat, a pattern will be observed on the outer surface of the panel 11 corresponding to the outline of the intersecting edges of the reinforcing means 13 immediately behind the panel 11. At those areas where the bonding of the reinforcing means 13 to the panel 11 is adequate, the pattern will appear as a relatively dark outline, as indicated in FIGURE 3 of the drawings. If, however, a discontinuity should exist in the underlying reinforcing means, the presence of the discontinuity will be evident from the presence of discontinuities 18 in the pattern of dye appearing on the face of the plate 11. This observation may be made by the naked eye or, in the case of fluorescent dyes or pigments, by the use of ultraviolet light.

The increased depth of color of the film along the lines or areas of good bonding is apparently due to the fact that the film is actually thicker along such lines or areas than where the bond is defective or where there is no bond.

It will be evident that various modifications can be made to the described embodiments without departing from the scope of the present invention.

I claim as my invention:

1. The method of detecting bond discontinuities in a sheet member backed by a reinforcing means bonded to said sheet member along only spaced areas thereof which comprises applying to an exposed surface of said sheet member a liquid coating of a dye dissolved in a flowable oil, and thereafter applying heat to said coating for a time sufficient to cause said dye to become contrastingly visible with respect to said surface in the areas at which said bonding occurs to said reinforcing means.

2. The method of detecting bond discontinuities in a sheet member backed by a reinforcing means bonded to said sheet member along only spaced areas thereof which comprises applying to an exposed surface of said sheet member a liquid coating of a pigment suspended in a flowable oil, and thereafter applying heat to said coating for a time sufficient to cause said pigment to become contrastingly visible with respect to said surface in the areas at which bonding occurs to said reinforcing means.

3. The method of detecting bond discontinuities in a continuous metal sheet member backed by a honeycomb type reinforcing means bonded to said sheet member only along spaced areas thereof which comprises applying to an exposed surface of said sheet member a liquid coating of a dye dissolved in a flowable oil, and thereafter applying heat to said coating for a time sufficient to cause said dye to become contrastingly visible with respect to said surface in the areas at which bonding occurs to said reinforcing means.

References Cited in the file of this patent

UNITED STATES PATENTS

| | | |
|---|---|---|
| 1,869,336 | De Forest | July 26, 1932 |
| 2,294,897 | Ellis | Sept. 8, 1942 |
| 2,405,078 | Ward | July 30, 1946 |
| 2,587,705 | De Forest | Mar. 4, 1952 |
| 2,839,918 | Switzer | June 24, 1958 |

OTHER REFERENCES

Publication: Nondestructive Testing, March-April 1955, pages 17 and 18, "Methods of Bond Testing," by McGonnagle et al.

Publication: "Symposium on Non Destructive Test, etc." (1958), ASTM No. 223, pages 6, 286, 352, 353. (Copy in Scientific Library.)